United States Patent [19]

Fegley et al.

[11] Patent Number: 4,495,396
[45] Date of Patent: Jan. 22, 1985

[54] ALIGNING A WORKPIECE TO A BODY

[75] Inventors: Charles R. Fegley, Laureldale; Lorenz Regneth, Wyomissing, both of Pa.

[73] Assignee: AT&T Technologies, Inc., New York, N.Y.

[21] Appl. No.: 438,230

[22] Filed: Nov. 1, 1982

[51] Int. Cl.³ ............................................. B23K 1/12
[52] U.S. Cl. .............................. 219/85 G; 219/85 M; 356/153; 358/101
[58] Field of Search .......... 219/85 R, 85 BA, 85 BM, 219/85 G, 85 M; 358/101; 356/138, 153, 154, 238, 241

[56] References Cited

U.S. PATENT DOCUMENTS

| | | | |
|---|---|---|---|
| 3,615,138 | 10/1971 | Pedrotti et al. | 356/153 |
| 3,684,384 | 8/1972 | Hojo et al. | 356/154 |
| 4,220,966 | 9/1980 | Montone | 358/101 |
| 4,233,520 | 11/1980 | Canfield | 356/238 |
| 4,289,374 | 9/1981 | Franken et al. | 356/138 |
| 4,296,998 | 10/1981 | Dufft | 350/96.20 |

Primary Examiner—Clifford C. Shaw
Attorney, Agent, or Firm—D. C. Watson

[57] ABSTRACT

A workpiece such as a minute stud (34) is aligned to a small porcelain body (36) to form a guide (40) for processing lightwaves. Such alignment includes registering a target (30) of an avalanche photodiode in a chip (32) on the stud (34) to a fiber receiving bore (44) in the body (36). Radiation, preferably in the form of a beam of light, is directed to a first end of the bore (44). Some portion of the light is redirected sufficiently to pass longitudinally along the surfaces of the bore (44) and thereby project an image from a second end of the body (36). The image is advantageously in the form of a halo which is enlarged and displayed on a video monitor (100). The stud (34) is manipulated about the first end of the bore (44) by operating micropositioning fixtures (66 and 68). The target (30) in chip (32) reflects light sufficiently to cast a preferably dark image of the target (30) through the bore (44) and its image onto the video monitor (100). Such manipulation continues until a desired alignment is achieved and the stud (34) is bonded to the body (36) to form the guide (40).

8 Claims, 7 Drawing Figures

ALIGNING A WORKPIECE TO A BODY

TECHNICAL FIELD

This invention relates to aligning a workpiece to a body having a bore. More particularly, the invention relates to aligning a semiconductor photodiode on a stud to a bore in a guide for receiving a light fiber.

BACKGROUND OF THE INVENTION

The manufacture of components for lightwave transmission via glass fibers is emerging as a natural and significant part of semiconductor work. For example, to receive light from a fiber, an avalanche photodiode (APD) is often formed in a silicon chip and utilized to convert such light to electrical pulses. Unfortunately, such components are so miniature and difficult to manipulate that coupling the output from a fiber to the input of a diode is a challenging task.

In a convenient coupling technique, the light emitting end of a fiber is slipped into a bore in a guide having a body typically about ⅛ inch in diameter and length. Prior thereto, at the opposite end of the body, a disc-like stud is installed having an APD chip mounted thereon which faces toward the bore. When the stud is carefully installed with the APD in proper position and the guide is slipped over the end of a fiber, light emitted therefrom impinges upon and operates the APD. A problem is to accurately align the APD to the bore because the APD has a microscopically small target area and the bore is correspondingly small.

It will be appreciated that an operator substantially obscures one end of a guide while aligning a stud thereto leaving only an opposite, fiber-receiving end for observing the alignment. Moreover, to properly guide a glass fiber the bore is made so small that one can barely discern it with the naked eye. Furthermore, it is difficult to look through the bore with a microscope to align an APD because one observes the bore and the target area in varying shades of grey.

Accordingly, it is desirable to develop new and improved expedients for aligning a workpiece to a body having a bore. It is further desirable to align a workpiece having a microscopically small target to a correspondingly minute bore in a small body.

SUMMARY OF THE INVENTION

Expedients are provided for aligning a workpiece, such as one including a photodiode, to a bore in a body such as a guide for a light fiber. Radiation is provided such as a beam of light directed to a first end of the bore. At least some portion of the light is redirected sufficiently to pass longitudinally along the surfaces of the bore. An image of the bore, conveniently in the form of a halo, is thereby projected from a second end of the bore. The image is displayed on a sensing device such as a video camera and monitor, preferably after the image is suitably magnified for ease of visual inspection. Expedients are also provided for manipulating the workpiece about the first end of the bore such that a target portion of the photodiode reflects a portion of the light. Advantageously, sufficient light is reflected to cast an image of the target through the bore and its halo onto the video monitor. Thereafter, such manipulation is continued until a desired alignment of the workpiece with respect to the bore is established.

BRIEF DESCRIPTION OF THE DRAWING

The invention will be more readily understood from the following detailed description when read in conjunction with the accompanying drawing wherein.

Figure 1:
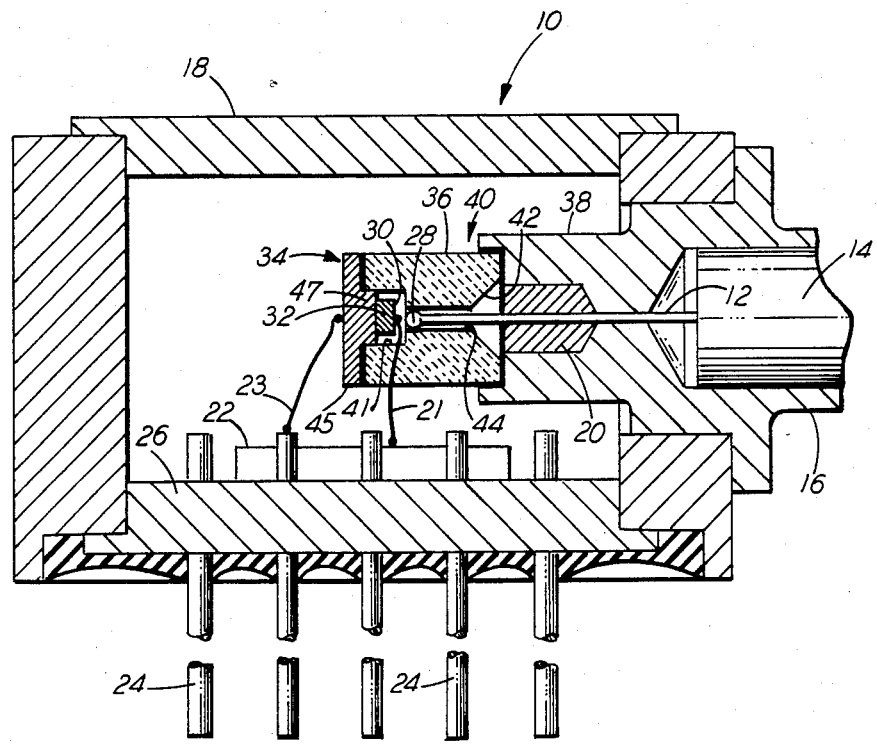
FIG. 1 is a cross-sectional view of a lightwave receiver including a fiber guide and a stud which are aligned according to the present invention.

It can be seen that some elements in the figures are abbreviated or simplified to highlight certain features of the invention. Also, where appropriate, reference numerals have been repeated in the figures to designate the same or corresponding features in the drawing.

DETAILED DESCRIPTION

A Workpiece and a Body

Utility of the invention is readily appreciated by reference to FIG. 1 which illustrates in cross section a lightwave receiver 10, part of a regenerator and repeater mechanism for light signals. A light pulse is transmitted within a glass fiber 12 protected by a jacket 14 which terminates in a ferrule 16 installed in a can 18. The bare fiber 12 protrudes through a seal 20 whereafter a light pulse is converted to an electrical pulse and fed to a film circuit (not shown) on a ceramic substrate 22. From substrate 22 the circuit is connected to an external regeneration circuit (not shown) by a lead 23 and by pins 24 installed in a header 26.

A convenient method of converting light utilizes an avalanche photodiode (APD) which amplifies a light pulse into a flow of electrons under a heavy bias across the APD. A problem is to suitably impinge a pulse of light from an enlarged end 28 of fiber 12 onto an active target portion 30 of an APD in a chip 32 mounted to a stud 34. The problem may be solved by slipping a body 36 of a guide 40 over the fiber 12 and installing such guide in a terminal portion 38 of ferrule 16. Prior thereto, the stud 34 is aligned with the body 36 in accordance with the practice of the invention.

The body 36 is conveniently formed about 0.115 inch in diameter and about 0.120 inch long. The material is preferably an unglazed alumina which serves as an insulator to avoiding grounding a lead 21 extending from the active target 30 in chip 32 to the circuit on substrate 22. A channel 41 is also formed in body 36 to accommodate lead 21 and the chip 32. A countersunk funnel 42 assists in guiding the fiber 12 into a bore 44 which is about 0.013 to 0.014 inch in diameter. Bore 44 confines the fiber 12 which may be about 0.008 inch in diameter and have an end portion 28 which is enlarged to from about 0.0118 to about 0.0128 inch in diameter. It will be appreciated from these fine measurements that the condition of end 28 and bore 44 are difficult to perceive with one's naked eye.

The free end of body 36 is adapted to receive the stud 34 with its features and accessories which will now be described. Stud 34 has a disc-like base 45 which is about 0.125 inch in diameter and about 0.015 inch thick. Located centrally on base 45 there is a pedestal 47 which is about 0.060 inch in diameter and adds about 0.017 inch to the thickness of stud 34. The material of stud 34 may be molybdenum or an alloy of iron-nickel-cobalt.

Figure 6:
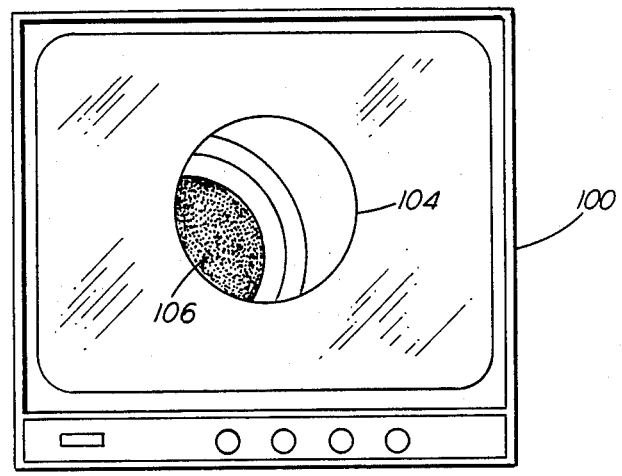
FIG. 6 shows images of a bore and a target projected onto a video monitor in accordance with the present invention.
Figure 7:
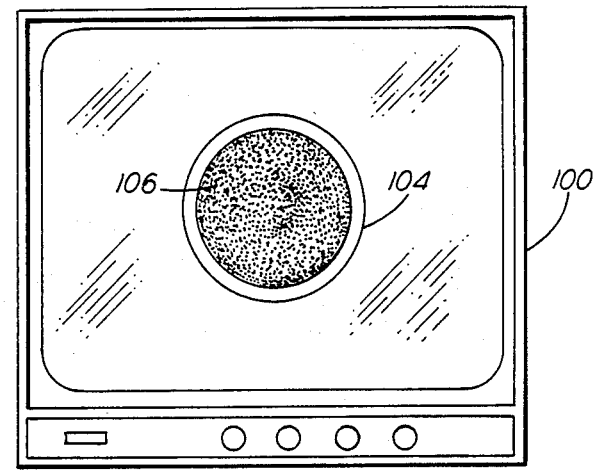
FIG. 7 is a similar view to that shown in FIG. 6 wherein the target is suitably aligned within the bore as depicted by images thereof on the video monitor.

The APD is formed in a silicon chip 32 which is about 0.036 inch wide, about 0.043 inch long and about 0.016 inch thick. In about the center of the exposed surface of chip 32 the diode is formed with an active target 30 which is generally circular and about 0.010 inch in diameter. Underlying and surrounding target 30, there is a metallized contact portion extending in a tear drop outline to which is bonded the lead 21. The active target of the APD is best seen in FIGS. 6 and 7 where it is greatly magnified and displayed on a monitor as will be explained hereinafter.

It will be appreciated that precise alignment of active target 30 to the enlarged end 28 of fiber 12 greatly facilitates operation of receiver 10. For example, the components should be so located about a longitudinal axis through guide 40 that target 30 and bore 44 are within 0.001 inch of being truly concentric with each other.

Such alignment may be achieved in the practice of the invention which will be further described by reference to the illustrated components. For example, the stud 34 may often be referred to as a workpiece 34. The guide 40 will include the workpiece 34, the body 36 and all the described features of each component. When reference is made to aligning the workpiece 34 to the body 36, it is to be understood that aligning the target 30 to the bore 44 controls the work and the joined components will be referred to as an assembled guide 40 or merely as an assembly.

Nevertheless, it is to be understood that the above-described components are merely illustrative of a workpiece and a body which may be aligned in the practice of invention and that other components may also be aligned according to the teachings which follow. However, it is presently preferred to describe the invention with respect to the stud 34 and the body 36 because of the challenges associated therewith.

Aligning the Components

Figure 2:
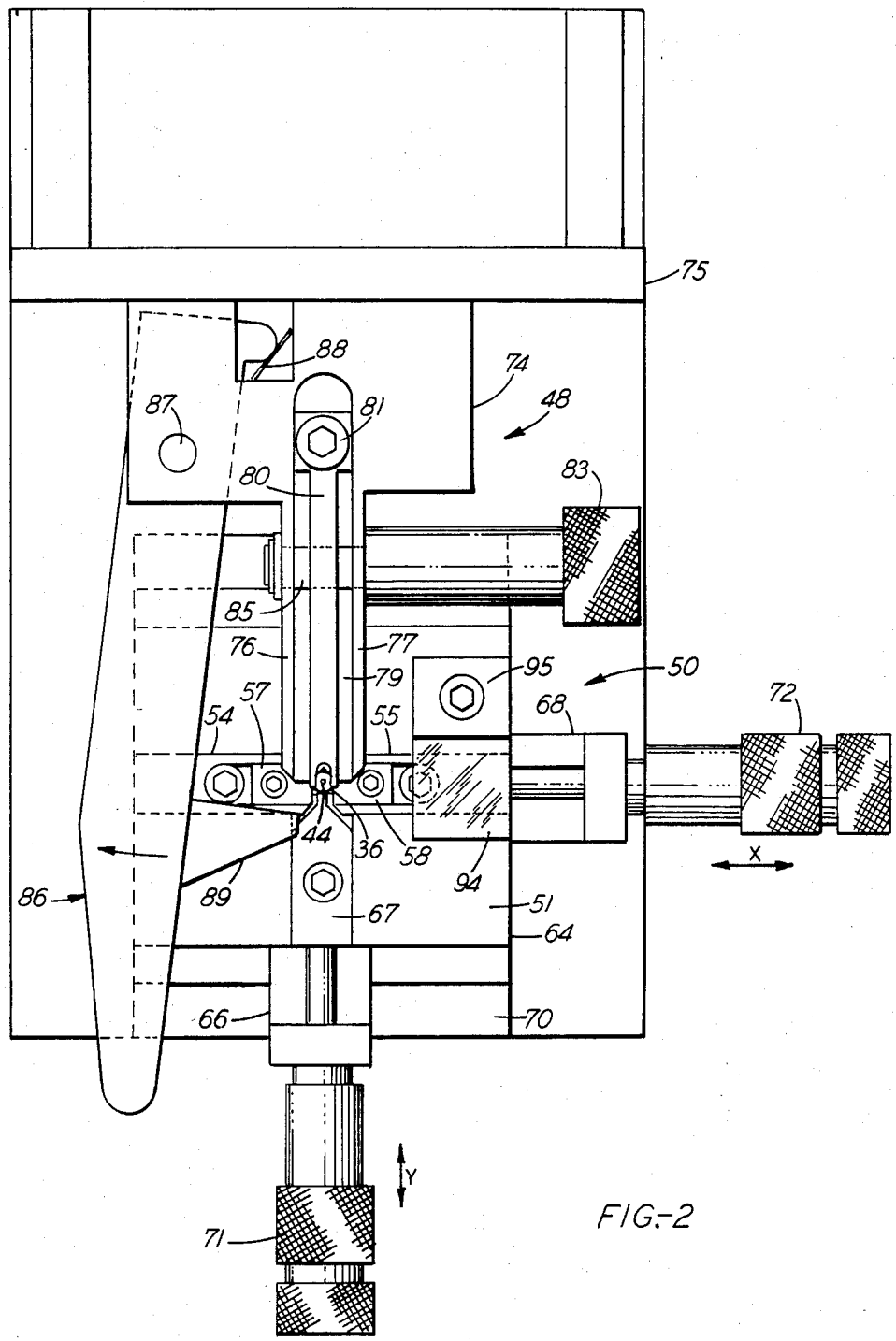
FIG. 2 is a plan view of apparatus for aligning a stud to a bore in a fiber guide according to the present invention.
Figure 3:
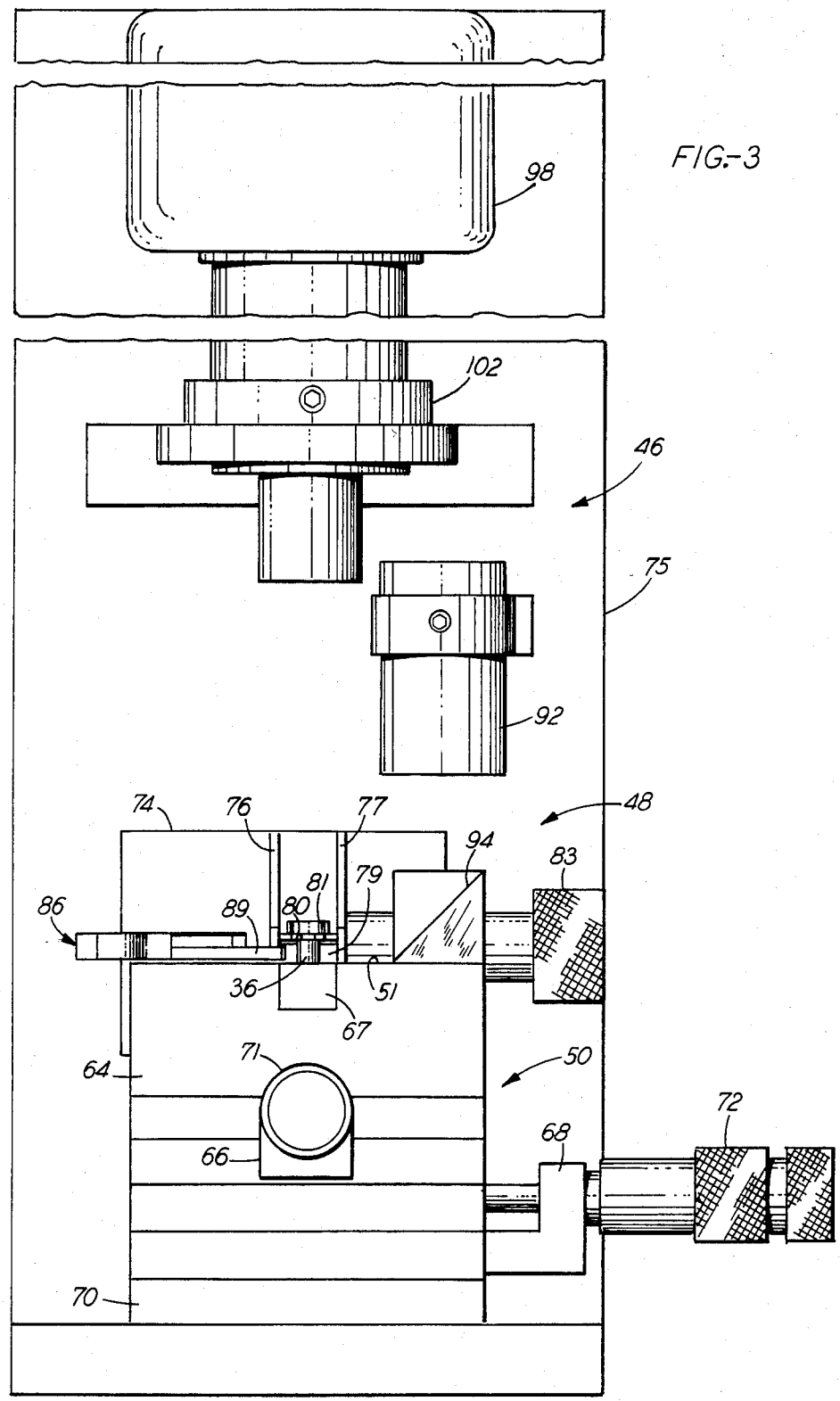
FIG. 3 is a front elevation view of the apparatus shown in FIG. 1 further including overhead equipment for viewing the aligning process.
Figure 4:
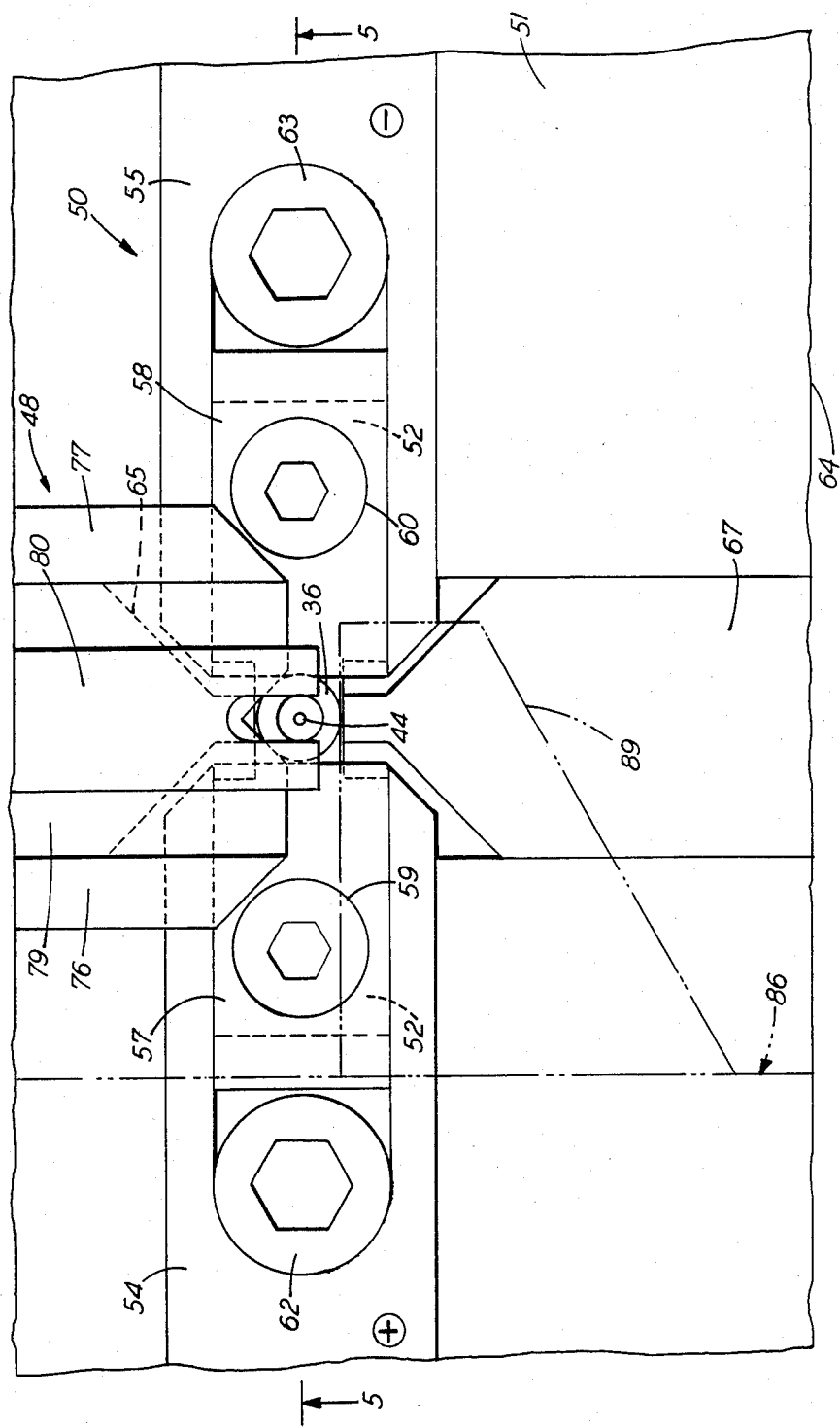
FIG. 4 is an enlarged portion of the plan view shown in FIG. 1.
Figure 5:
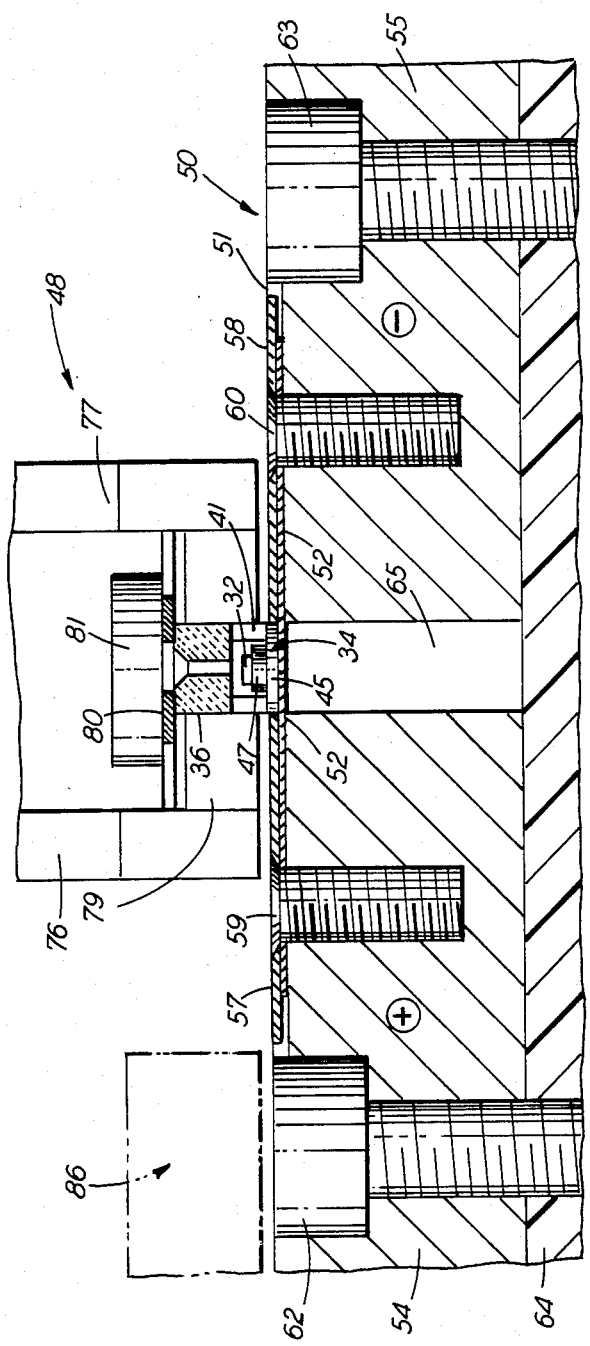
FIG. 5 is a cross-sectional view of the apparatus shown in FIG. 4 taken along line 5—5.

Reference is made to FIGS. 2 and 3 which are plan and front elevation views, respectively, of apparatus for aligning components according to the invention. The apparatus (FIG. 3) includes an upper portion 46 for viewing and illuminating the work, a fixed portion 48 for securing the body 36 and a movable portion 50 for securing and manipulating the workpiece 34. A line 51 is shown in FIG. 3 to designate a work surface for handling components and such line and the surface it represents best indicate the separation between fixed portion 48 and movable portion 50. Reference is also made to FIGS. 4 and 5 which are enlarged plan and sectional views, respectively, of workholding features of the portions 48 and 50 of the apparatus.

An operator first selects a stud 34 and places it in a nest which is best seen in FIG. 5. The stud 34 is supported by a resistance heating element 52 connected between electrodes 54 and 55. The element is overlaid by plates 57 and 58 which are set flush with work surface 51 and have opposing ends which aid in confining stud 34. Plates 57 and 58 are affixed to electrodes 54 and 55, respectively, by countersunk screws 59 and 60. Element 52 is restrained by the same screws but sufficient clearances (not shown) are provided to permit thermal expansion of element 52.

It is further seen that electrodes 54 and 55 are affixed by sunken cap screws 62 and 63, respectively, to a support block 64. Support block 64 is extensively utilized as a work table by cutting recesses into its top surface 51 as will be seen in FIG. 4. For example, recesses are cut into surface 51 of block 64 to receive plates 65 and 67 and each plate tapers to an abutment edge to complete the nest for confining the base 45 of stud 34 (FIG. 5) in movable portion 50 of the apparatus.

Portion 50 is provided for manipulating the workpiece 34 in an X-direction (left-to-right) or a Y-direction (front-to-back) as indicated in FIG. 2. It can be seen in FIG. 3 that block 64 is affixed to a micropositioning fixture 66 for movement in the Y-direction. Fixture 66 is, in turn, affixed to a micropositioning fixture 68 for movement of block 64 and fixture 66 in the X-direction and fixture 68 is affixed to a base 70. Both fixtures 66 and 68 have lower, normally stationary plates and upper plates which are moved by operation of micrometer screw heads 71 and 72, respectively. Consequently, stud 34 may be moved in very fine increments in either the X or the Y-direction.

After placing a stud 34 in the nest in movable portion 50, an operator places a body 36 upon the stud and such body is restrained in portion 48 of the apparatus. As best seen in FIGS. 2 and 3, portion 48 includes a block 74 which is supported by a stand 75 which also supports the viewing portion 46 of the apparatus. Block 74 has a front extending portion which includes two sidewalls 76 and 77 and a flat member 79 having a "V" notch to confine the body 36.

Between sidewalls 76 and 77 and on top of flat member 79, a flat leaf spring 80 is installed. Spring 80 is affixed to member 79 by a screw 81 in the back and the leaf is biased downwardly toward the front on top of the body 36. Spring 80 is raised or lowered by operating a knob 83 which turns a shaft having a flat portion 85 thereon located between sidewalls 76 and 77 and under the leaf spring.

A body 36 may be further restrained in the "V" notch of member 79 by an arcuately movable clamp 86 shown in an inactive condition for clarity in FIGS. 2 and 3. Clamp 86 is pivotally mounted in block 74 by a pin 87 and is arcuately biased by a leaf spring 88 toward the "V" notch where a finger portion 89 contacts body 36 as seen in phantom in FIG. 4.

It has been found that one cannot effectively align a target as small as target 30 to a bore such as bore 44 in a body 36 without the aid of magnification. Yet, it has been found extremely difficulty to utilize a conventional microscope or similar means to look into bore 44 to make the alignment because one sees target 30 and bore 44 in varying shades of gray. The problem is additionally complicated by the fact that one substantially obscures the lower end of the body 36 while attempting to align the stud 34 thereto.

However, expedients have been discovered for creating images of the bore 44 and the target 30, and for comparing one with the other, even while aligning the stud 34 to the body 36. Aligning the components by creating and comparing the images is achieved by apparatus shown in FIGS. 2-7.

As best seen in FIG. 3, a preferred form of radiation, for example, visible light, is generated by a lamp 92 and directed to the lower portion of the body 36 by a prism 94, secured to block 64 by a bracket 95 (FIG. 2). It has been found that very little light is required to delineate the bore 44 and project an image thereof from the upper end of the body 36. The light radiation is seen to be redirected sufficiently to pass longitudinally along the surfaces of the bore 44 such that an image thereof may be clearly sensed above the body 36, for example, by a viewing device.

In the preferred embodiment, the viewing device is a commercially available video camera 98, supported by stand 75, and used in conjunction with a video monitor 100 shown in FIGS. 6 and 7. For ease of viewing the fine images of the bore 44 and the target 30, a lens system 102 is attached to camera 98. Preferably the lens system 102 magnifies the images about thirty times so a 0.013 inch diameter bore 44 appears to be about ⅜ inch in diameter to camera 98.

Other sensors of radiation may be utilized in the practice of the invention. For example, an optical microscope could be utilized to observe a lighted image. However, it has been found that the projected image of the bore 44 is in the form of a halo. Consequently, the image appearing on monitor 100 appears to have a circular shadow line which is distinctive and is preferably viewed on a typical video screen.

The precise optical phenomena which creates the halo is not known. It has been theorized that the unglazed alumina which is utilized to form the body 36 may contribute diffracted light about the surfaces of the bore. Such light would have a slightly different wavelength if it enters and emerges from the observed vitreous surface of the finished material of body 36. However, a body 36 made of aluminum metal has been machined to the dimensions set forth for the body 36 and also illuminated in the same manner as a body formed of the alumina material. It was found that a similar, useful halo of the bore in the aluminum metal appeared on the monitor 100 although with less brightness than with the alumina body.

It has been mentioned that the body 36 has a channel 41 (FIG. 1) formed therethrough at the lower end to accommodate the chip 32, its mounting and wire lead 21. Although not critical to the invention, such channel 41 offers a convenient passageway for light to reach the lower end of bore 44. Also, when stud 34 is manipulated by X-Y fixtures 68 and 66, respectively, the channel 41 provides convenient access for light to reach target 30 on chip 32. However, even with minimal access for light into an unbonded joint, the workpiece reflects sufficient light to cast an image of target 30 through bore 44 and its image onto monitor 100.

By reference to FIGS. 6 and 7 the images of the bore 44 and the target 30 are shown in various stages of alignment. A suitable monitor 100 may measure about nine inches diagonally across the screen. The scale of viewing is such that the enlarged bore 44 measures from three to about four inches on the screen and the target 30 is correspondingly smaller. Note that the unaligned portion of target 30 does not show on FIG. 6 indicating that body 36 does not pass sufficient light to provide a noticeable shadow outside the halo of bore 44.

Of course, the stud 34 is manipulated by utilizing portion 50 of the apparatus until a full image of target 30 appears within the halo of bore 44 as shown in FIG. 7. Thereafter, the stud 34 is bonded to the body 36 and the assembly is ready for installation in a receiver as shown in FIG. 1.

Alternate and Miscellaneous Considerations

It has been explained that the images of the bore 44 and the target 30 are preferably captured by a video camera 98 and displayed upon a video monitor 100. Such sensing and viewing of the alignment procedure offers an operator great freedom to work about the apparatus without obstruction by conventional equipment such as microscopes and alternate illuminating devices. Experience with the illustrative embodiment of the invention has shown that a work cycle in assembling the components now consumes about ten seconds compared with 110 seconds using prior art mechanisms. Consequently, the invention has produced unusually satisfactory results. Such results are in part associated with the ease with which alignment takes place. The results are also at least partially associated with a novel bonding technique which will now be described.

Referring to FIGS. 4 and 5, electrodes 54 and 55 are each connected to respective poles of a power supply (not shown) for providing electrical current adequate for the bonding. According to conventional designation, such current is conducted from the positive electrode 54 at least partially along a path through the workpiece 34 to the negative electrode 55. The path is selected as shown, by supporting workpiece 34 on a resistive member 52 connecting the electrodes. Member 52 may include a center opening therein to advantageously concentrate current within base 45 of the workpiece. Such current concentrates where heat for bonding is required rather than in pedestal 47 or elsewhere throughout the entire workpiece 34. Conveniently, a washer of solder is placed on the base 45 of the workpiece 34 under a metallized ring seat in the body 36. A short pulse of about 60 to 70 amps of current at 1 to 1.5 volts for about 2 seconds is sufficient to liquefy the solder and effect an adequate bond. Moreover, the electrodes are sufficiently massive that they remain at about room temperature. Consequently, by the arrangement shown, a heat sink is provided when current stops, to conduct heat from the workpiece 34 which permits the assembly to be rapidly removed without breaking the bond to the body.

It should be pointed out and emphasized that such bonding is disclosed herein for disclosing a presently preferred mode of practicing the invention. The bonding method and means are more fully described and claimed in an application entitled "Bonding a Workpiece to a Body" filed the same day as and assigned to the same assignee as the present application. To the extent that additional information may be required herein, the application referred to is hereby incorporated herein and made a part hereof by this reference.

It is expected that the teachings set forth herein for aligning a workpiece to a body having a bore are adequate to instruct one of ordinary skill in the art to practice the invention. Nevertheless, to facilitate such practice, certain suitable designation of apparatus may be of value. For example, suitable items for fixtures 66 and 68 are those designated as Micropositioners Model-B, and sold by the Line Tool Company, Allentown, Pa. A suitable lens system 102 comprises four sets of extension tubes, a doubler lens and a 75 mm lens sold by Video Marketing, Inc. of Warrington, Pa. A suitable video camera 98 is designated as an Hitachi TV Camera HV620 and a suitable video monitor 100 is designated as an Hitachi Monitor VM-906A.

There have been illustrated herein certain practical embodiments of the invention and certain applications thereof. Nevertheless, it is to be understood that various modifications and refinements may be made and used which differ from these disclosed embodiments without departing from the spirit and scope of the present invention.

What is claimed is:

1. Apparatus for aligning a workpiece to a bore in a body, comprising:
    means for providing radiation directed to a first end of the bore such that at least some portion of such radiation is redirected sufficiently to pass longitudinally along the surfaces of the bore thereby projecting an image of said bore from a second end thereof;
    means for sensing said projected image of said bore;
    means for manipulating the workpiece about the first end of the bore such that at least a target portion of said workpiece reflects the radiation sufficiently to cast an image of the target through the bore and through the image of the bore onto the sensing means, such manipulation continuing until a desired alignment of the workpiece with respect to the bore is achieved.

2. Apparatus as in claim 1 wherein the radiation means provides a beam of visible light and the body further comprises:
    a passageway formed from the exterior and transversely of the body to at least the first end of the bore; and
    the beam of light is directed through the passageway to said first end.

3. Apparatus as in claim 1 wherein the sensing means further comprises:
    a lens system to magnify the images of the bore and the target; and
    a video camera with monitor to capture the images for viewing purposes.

4. Apparatus as in claim 1 wherein the manipulating means further comprises:
    heating means for supporting the workpiece during said manipulating such that said workpiece is aligned for a time sufficient for heating and bonding the workpiece to the body.

5. A method of aligning a workpiece to a bore in a body, comprising:
    providing radiation directed to a first end of the bore such that at least some portion of such radiation is redirected and passes longitudinally along the surfaces of the bore thereby projecting an image of said bore from a second end thereof:
    sensing said projected image of said bore;
    manipulating the workpiece about the first end of the bore such that at least a target portion of said workpiece reflects the radiation sufficiently to cast an image of the target through the bore and through the image of the bore onto the sensing means, such manipulation continuing until a desired alignment of the workpiece with respect to the bore is achieved.

6. A method as in claim 5 wherein a passageway is formed from the exterior and transversely of the body to at least the first end of the bore and the step of providing radiation further comprises:
    providing a beam of visible light; and
    directing the beam of light through the passageway of the body to said first end of said bore.

7. A method as in claim 5, wherein the sensing step further comprises:
    magnifying the images of the bore and the target; and
    capturing the images via a video camera with monitor for visually observing the alignment of one image with respect to the other.

8. A method as in claim 5 wherein the manipulating step further comprises:
    supporting the workpiece on heating means during said manipulating such that said workpiece is aligned for a time sufficient for heating and bonding the workpiece to the body.

* * * * *